United States Patent
Ioffe

(10) Patent No.: US 7,029,633 B2
(45) Date of Patent: Apr. 18, 2006

(54) METHOD AND APPARATUS FOR REDUCING URANIUM TRIOXIDE

(75) Inventor: Mikhail Simonovich Ioffe, Cobourg (CA)

(73) Assignee: Cameco Corporation, Port Hope (CA)

(*) Notice: Subject to any disclaimer, the term of this patent is extended or adjusted under 35 U.S.C. 154(b) by 638 days.

(21) Appl. No.: 09/795,090

(22) Filed: Mar. 1, 2001

(65) Prior Publication Data

US 2001/0014305 A1  Aug. 16, 2001

Related U.S. Application Data

(62) Division of application No. 09/203,760, filed on Dec. 2, 1998.

(51) Int. Cl.
  *B01J 8/26* (2006.01)
  *B01J 8/42* (2006.01)
(52) U.S. Cl. ............ 422/140; 422/142; 422/143; 422/146; 422/159
(58) Field of Classification Search .......... 422/140, 422/142, 143, 146, 159, 186, 186.29, 903
See application file for complete search history.

(56) References Cited

U.S. PATENT DOCUMENTS

| | | | |
|---|---|---|---|
| 3,609,095 A | 9/1971 | Wyatt | 252/301.1 |
| 4,364,859 A | 12/1982 | Ohtsuka et al. | 252/643 |
| 4,389,355 A | 6/1983 | Thornton et al. | 264/0.5 |
| 4,400,604 A | 8/1983 | Ohtsuka et al. | 219/10.55 |
| 4,476,098 A | 10/1984 | Nakamori et al. | 422/140 |
| 4,563,335 A | 1/1986 | Akiyama et al. | 422/159 |
| 4,565,670 A | 1/1986 | Miyazaki et al. | 422/186.04 |
| 4,643,866 A | 2/1987 | Thornton et al. | 376/245 |
| 4,727,231 A | 2/1988 | Hayano et al. | 219/10.55 R |
| 4,786,478 A | 11/1988 | Ahmed et al. | 422/186.03 |
| 4,880,578 A | 11/1989 | Holcombe et al. | 264/26 |
| 5,009,817 A | 4/1991 | Hodgson | 264/0.5 |
| 5,066,429 A | 11/1991 | Larson et al. | 264/0.5 |
| 5,069,888 A | 12/1991 | Larson et al. | 423/260 |
| 5,321,223 A | 6/1994 | Kimrey, Jr. et al. | 219/745 |
| 5,417,943 A | 5/1995 | Braehler et al. | 423/2 |
| 5,421,855 A | 6/1995 | Hayden, Jr. et al. | 75/393 |
| 5,581,589 A | 12/1996 | Yamagishi et al. | 376/411 |
| 5,589,140 A | 12/1996 | Takahashi | 422/159 |

FOREIGN PATENT DOCUMENTS

| | | |
|---|---|---|
| BE | 893.824 | 11/1982 |
| BE | 894.371 | 1/1983 |
| CA | 1 197 069 | 11/1985 |

(Continued)

OTHER PUBLICATIONS

J. D. Ford et al., "High Temperature Chemical Processing via Microwave Absorption.", The Journal of Microwave Power 2-2, vol. 61, pp. 61-64, (1997), Department of Chemical Engineering, University of Waterloo, Waterloo, Ontario, Canada, no month.

(Continued)

*Primary Examiner*—Len Tran
(74) *Attorney, Agent, or Firm*—Foley & Lardner LLP

(57) ABSTRACT

Uranium trioxide is reduced to uranium dioxide using microwave radiation or radiofrequency radiation directed in such a way that the radiation encounters an interface between uranium trioxide and the uranium-containing reduction product without first having passed through that product. By this method, and also using a reducing gas, it is possible to obtain $UO_2$ with an O:U ratio less than 2.04:1.

10 Claims, 1 Drawing Sheet

FOREIGN PATENT DOCUMENTS

JP          58-194742          11/1983          ............... 423/261

OTHER PUBLICATIONS

Paul A. Haas, "Heating of Uranium Oxides in a Microwave Oven.", American Ceramic Society Bulletin, vol. 58, No. 9, p. 873, (1979), Oak Ridge National Lab, Oak Ridge, Tennessee, no month.

W. M. Loock et al., "Microwave Treatment of Uraniumoxides.", SPRECHSAAL, vol. 122, No. 12, pp. 1157-1159, (1989), State University of Ghent, Sint-Pietersnieuwstraat 41, B 90000 Gent, Belgium, no month.

E. F. Sturcken et al., "Microwave Enhanced Pyrochemical Reactions of $PuO_2$, $UO_2$, and $U_3O_8$.", Ceramic Transactions, vol. 21, pp. 117-123, (1991), Westinghouse Savannah River Company, Aiken, South Carolina 29808-0001, no month.

METHOD AND APPARATUS FOR REDUCING URANIUM TRIOXIDE

This application is a Divisional application of 09/203,760, filed Dec. 2, 1998.

FIELD OF THE INVENTION

The present invention provides a method and apparatus for reducing uranium trioxide, $UO_3$, to a lower oxide of uranium, preferably uranium dioxide, $UO_2$.

BACKGROUND OF THE INVENTION

Uranium dioxide is used to produce ceramic $UO_2$ pellets for nuclear power plants, or as a source for production of uranium tetrafluoride, $UF_4$. The $UF_4$ is then further used to produce metallic uranium, or is converted to uranium hexafluoride, $UF_6$, by fluorination. Conventional methods for producing $UO_2$ typically yield a product with an oxygen to uranium ratio of 2.04 or greater. It is important that the uranium dioxide feedstock for fluorination have an oxygen to uranium ratio close to 2.00. Uranium dioxide feedstocks in which this ratio is significantly higher than 2.00 cause formation of uranyl fluoride, $UO_2F_2$, which contaminates the $UF_4$ product. This reduces yields and increases the cost of fluorination.

One method for preparing uranium dioxide is to reduce pulverized uranium trioxide powder in a hydrogen atmosphere, usually in a conventionally heated fluidized bed, at a temperature of about 700° C. The chemical conversion is represented by equation (1)

$$UO_3 + H_2 \rightarrow UO_2 + H_2O \quad (1).$$

The $UO_2$ obtained under these conditions normally has a minimum O:U ratio of 2.04. To reduce this ratio further, two approaches are known: 1) the particle size of the $UO_3$ starting material is reduced to the micrometer range; or 2) a higher temperature is used. Neither of these solutions is particularly satisfactory. To obtain a sufficiently small $UO_3$ particle size, special precipitation techniques may be required. Such techniques are time-consuming, often difficult to carry out, and expensive. Option 2), increasing the temperature of a fluidized bed reactor, requires a considerable increase in energy consumption. Heat transfer in such reactors is highly inefficient due to low thermal conductivity of the bed, and significant heat is lost with the flow of fluidizing gas.

The fluidized bed method suffers from other drawbacks. High flow rates of carrier gas and hydrogen are required to support the fluidization, with the result that hydrogen consumption is approximately 170% to 190% of the stoichiometric amount indicated by equation (1). The $UO_3$ starting material must be pulverized prior to feeding into the reactor. The process is highly sensitive to particle size distribution. Furthermore, high maintenance costs are incurred because heating elements must be periodically replaced, requiring shutting down of the reactor.

It has been proposed to produce sinterable $UO_2$ by the use of microwave heating [Canadian patent No. 1,197,069; Thornton, Thomas A.; Holaday, Veldon D., Jr., which is incorporated herein by reference]. Thornton et al propose a process that involves the absorption of microwave radiation by uranyl nitrate hexahydrate (UNH), ammonium diuranate (ADU) or ammonium uranyl carbonate (AUC). These uranium salts are decomposed, preferably in an oxidizing atmosphere, at elevated temperatures, to yield an intermediate product which may have a uranium oxide stoichiometric range of from $UO_3$ to $U_3O_8$. The intermediate product is further heated in a microwave furnace, in a reducing atmosphere, to reduce it to sinterable uranium dioxide powder.

Thornton et al, in U.S. Pat. No. 4,389,355, which is incorporated herein by reference, have proposed a process for preparing nuclear fuel pellets that involves sintering $UO_2$ powder and an organic binder in a microwave induction furnace in a reducing atmosphere. Sintered compacts are cooled under reducing atmospheric conditions and then ground to the desired finished uranium dioxide pellet product. Scrap uranium dioxide powder and rejected pellets are recycled to a microwave Induction furnace where they are heated in an oxidizing atmosphere to convert $UO_2$ to $U_3O_8$. The $U_3O_8$ is then blended with $UO_2$ and organic binder at the beginning step of the nuclear fuel pellet preparation process.

Ford and Pei, in the Journal of Microwave Power, 2—2, 1967, pages 61 to 64, the disclosure of which is incorporated herein by reference, propose heating various materials, including uranium dioxide, by microwave radiation.

Paul Haas discusses heating uranium oxides in a microwave oven; see page 873 of the American Ceramic Society Bulletin, Volume 58, No. 9, (1979) the disclosure of which is incorporated herein by reference. Haas found that $UO_2$ and $U_3O_8$ samples heated strongly under microwave irradiation. Dry $UO_3$ samples did not show any significant heating when exposed in a microwave oven. However, in tests on microwave drying of samples of hydrated $UO_3$ gel spheres, hot spots were observed to develop. Haas suggested that the hydrated gel first underwent small amounts of reduction from traces of $NH_3$ and organic materials in the gel. Once overheating started, hexavalent uranium was converted to $U_3O_8$, which absorbs microwave energy.

Use of microwave energy to heat oxides of uranium is also discussed by Van Loock and Tollenaere, Sprechsaal, Vol 122, No. 12, 1989, pages 1157–1159 and by Sturcken and McCurry, in Ceramic Transactions 1991, Volume 21, pages 117–123, the disclosures of which are incorporated herein by reference.

A problem encountered when microwave energy is used to heat uranium oxides to convert them to $UO_2$ is that the microwave energy is absorbed and attenuated in the outer layer of the irradiated uranium oxides, where the $UO_2$ product is first formed, and does not penetrate deeply into the material. The interior of the material is screened by the outer layer of $UO_2$, so that the microwave energy is absorbed in the outer layer and does not penetrate to the interior. This leads to overheating of the outer layer (thermal runaway), resulting in non-uniform heating, and a cool reactor core. Ford and Pei encountered non-uniform heating of uranium dioxide which, they say, was very unsatisfactory and caused a suspension of experiments. It may be possible to reduce this screening effect and to avoid non-uniform heating by sophisticated powder mixing techniques, but these techniques are not practical on a large industrial scale.

Thus, the idea of direct microwave heating of uranium oxides with microwaves in a single mode resonant cavity or multimode oven applicators has been demonstrated with small loads, less than about 50 grams, by the several above-mentioned workers, whose publications are incorporated herein by reference. However, this technique is not feasible for larger scale applications, where the dimensions of processing material load are much greater, so that the desired length of the path of the radiation in the material is much greater than the penetration depth of the microwave radiation. The penetration depth of microwave radiation into $UO_2$ is in the millimeter or centimeter range. Due to the attenuation of the microwave power in the outer layers of the reduced $UO_2$ product, the inner part of the processing material load will not be irradiated, and heating of the inert part occurs by thermal conductivity and load mixing only.

SUMMARY OF THE INVENTION

In one aspect, the present invention provides a method of reducing $UO_3$ which comprises subjecting $UO_3$ to heat generated by microwave or radiofrequency radiation, wherein the radiation is supplied from a direction in which it encounters an interface between $UO_3$ and another oxide of uranium, without having first passed through the said other oxide of uranium.

Thermal decomposition of $UO_3$ to $U_3O_8$ takes place at high temperature, say about 900° C., and can be carried out with microwave or radiofrequency radiation. Preferably, however, the reaction is carried out in the presence of a reducing gas and the product of reduction is $UO_2$, particularly $UO_2$ having an O:U ratio that is less than 2.04:1.

In another aspect the invention provides an apparatus for use in the above method, which apparatus comprises a container for containing $UO_3$ and the said other oxide of uranium, and a source of microwave radiation or radiofrequency radiation that directs the radiation towards the interface between the $UO_3$ and the said other oxide of uranium in such a manner that, in operation of the apparatus, the radiation encounters the interface without having first passed through the said other oxide of uranium. In use, the apparatus is preferably connected to a source of reducing gas, which gas passes through the reaction mixture. The gas preferably passes through the reaction zone and then into the $UO_3$, thereby assisting in heating the $UO_3$ by convection.

The advantages of using microwave heating are manifold. Microwave energy is absorbed directly by the material being processed, provided that the material has a sufficient "dielectric loss factor" (the dielectric loss factor reflects the extent to which a material converts microwave energy to heat). The microwave energy can be transported from a generator to a load using waveguides, and the microwave generating device (magnetron) can be quickly and easily replaced when necessary, without shutting down the entire process.

When a material has sufficient dielectric loss factor most of the incident microwave power is absorbed within the material, and heat is liberated in sufficient quantity to initiate the reaction. The rate of heat liberation is proportional to the product of the dielectric loss factor and the density of microwave power. The value of the dielectric loss factor (the imaginary part of the dielectric constant) for uranium oxides is a function of their composition and the frequency of the electromagnetic (microwave or radiofrequency) field; it also changes with temperature.

$UO_2$ has high dielectric loss factor and therefore is readily heated by microwave or radiofrequency radiation. Pure dry $UO_3$ is not heated by microwave or radiofrequency radiation. At the interface between $UO_3$ and $UO_2$ the radiation encounters and heats $UO_2$. Heat is then transferred by conduction, and also by convection with the reducing gas, from the heated $UO_2$ to the $UO_3$. The $UO_3$ decomposes, under the influence of the heat and the reducing gas, to form $UO_2$. At the $UO_2/UO_3$ interface, therefore, there is formed a reaction zone that propagates by advancing into the mass of $UO_3$ as the reaction proceeds. Problems caused by $UO_2$ shielding material from radiation are therefore reduced or avoided.

DESCRIPTION OF THE PREFERRED EMBODIMENTS

As stated above, pure dry $UO_3$ is not heated by the radiation. Hence, it is convenient to direct the radiation through the $UO_3$ to the $UO_2/UO_3$ interface.

It will be appreciated that heat is required to initiate the decomposition of $UO_3$ to microwave absorbing species. The heat can be supplied by any suitable means. It is convenient to use an initiator, which may be any material, including non-uranium material, which absorbs the microwave energy and can transfer the liberated heat to the $UO_3$ feed material. It is preferred to use a uranium oxide initiator, however, as a non-uranium initiator may contaminate the $UO_2$ product. The initial high temperature in a layer of $UO_3$, required for initiation, can also be created by using means other than microwave technology, such as conventional heating of a localized volume of the $UO_3$ bed, utilization of an electric current through a conducting medium, electric arc, or any other means to cause decomposition or reduction in a localized area of the $UO_3$ load so that an interface is created between $UO_3$ and a microwave absorbing material.

If a microwave-absorbing material is to be used as initiator, it is desirable that the length of the path of the microwave radiation in the layer of absorbing material shall be equal to the penetration depth of the microwave radiation in the material, or greater. Microwave energy is exponentially attenuated in an absorbing material. The heat released due to the microwave absorption at a depth x from the surface may be presented as $P(x)=P(0) \exp(-x/D)$, where $P(0)$ is the heat released near the surface and D is the penetration depth of the microwaves in the material under consideration. This formula shows that the released heat decreases 2.7 times at a distance D, which means that 63% of the microwave energy passing through the material is absorbed within the layer of penetration depth. When the thickness is much greater than the penetration depth, most of the microwave energy passing through the material is absorbed, releasing heat. This is the case, for instance, when the $UO_3$ reduction process has been proceeding for a while and the reaction zone has propagated significant distance, in particular in the continuous mode. If the thickness of the absorbing layer (initiator) is too small, only a fraction of the microwave power is absorbed, and this may be not sufficient to initiate the reduction of $UO_3$.

Oxides of uranium are sometimes classified as stoichiometric or non-stoichiometric. Stoichiometric oxides of uranium are characterized by the existence of definite crystalline phases that may usually be identified using diffraction techniques (X-Ray, electron or neutron diffraction, EXAFS, etc.). Such phases have a composition expressed in simple ratio numbers, e.g. $UO_2$, $U_3O_8$, $U_4O_9$, $UO_3$. Depending of the material history and environment, the ordered crystal structure of a single phase of a uranium oxide may have defects such as the absence of some oxygen atoms in the lattice or an excess of them (interstitial atoms), and oxides with such defects are known as non-stoichiometric oxide. Examples of non-stoichiometric compounds include $UO_{2+x}$, $U_3O_{8-x}$ and $U_4O_{9-y}$. Dielectric characteristics of non-stoichiometric uranium oxides strongly depend on the concentration of such defects (i.e., on the composition of the material). Practically all of the uranium oxides, excluding $UO_3$, absorb microwave energy. The invention can use stoichiometric or non-stoichiometric oxides as initiators, and oxides that may be formed as intermediates in the reaction may be stoichiometric or non-stoichiometric.

The method can be carried out in batch fashion. In one embodiment of a batch process, a reactor is loaded with $UO_3$ and a small quantity of $UO_2$ to serve as initiator, so that there is formed a $UO_2/UO_3$ interface. The thickness of the $UO_2$ layer is preferably of the order of the penetration depth of the microwave radiation employed, or greater. In the case of 2450 MHz or 915 MHz radiation, it is preferably equal to or greater than about 3 mm. It is desirable that the thickness of the layer of initiator ($UO_2$ or $U_3O_8$ or $U_4O_9$ or their mixture or any other non-stoichiometric uranium oxide absorbing the microwave power or any other material absorbing the microwave power) be of the order of, or greater than, the penetration depth of the microwave radiation used in the process. As the reaction proceeds a reaction zone forms at the interface and advances through the reactor as $UO_3$ is converted to $UO_2$. The direction of flow of the reducing gas is preferably countercurrent to the direction of advance of the reaction zone.

Alternatively, the method can be carried out in continuous fashion. $UO_3$ is continuously fed into the reactor and formed $UO_2$ is continuously withdrawn from the reactor. If the rates of supply and withdrawal are correlated with the rate of advance of the propagating reaction zone through the reaction mass it is possible to maintain the interface more or less, or precisely, stationary.

In the reduction of $UO_3$ to $UO_2$ there may be formed the oxides $U_3O_8$ and $U_4O_9$. These, like $UO_2$, absorb the radiation, which is converted to heat, so that these oxides act generally in the same way as $UO_2$. These oxides can be used in place of $UO_2$ to form the initial interface with $UO_3$, i.e., these oxides can serve as the initiator. As the reaction proceeds in the presence of reducing gas the $U_3O_8$, $U_4O_9$ and $UO_3$ become converted to $UO_2$ which forms the interface with the $UO_3$ as the reaction proceeds.

By the method of the invention it is possible to obtain $UO_2$ with a stoichiometric ratio of O:U that is less than 2.04:1 and preferably less than 2.01:1. This $UO_2$ is particularly suitable for conversion to $UF_4$, so in a preferred aspect the invention includes the step of converting obtained $UO_2$ to $UF_4$, for instance by the reaction:

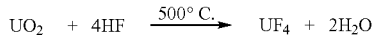

$$UO_2 + 4HF \xrightarrow{500°C.} UF_4 + 2H_2O$$

or by treatment of $UO_2$ with dichlorodifluoromethane, at 500–600° C. (see, for example, Van Nostrand's Scientific Encyclopedia, 5th Edition, pg. 2264, and Advanced Inorganic Chemistry, Cotton, F. A., and Wilkinson, G., 5th Edition, pg. 1004) the disclosures of which are incorporated herein by reference.

Although the invention provides $UO_2$ with a low O:U ratio that is particularly suitable for conversion to $UF_4$, the $UO_2$ can be used for other purposes. The $UO_2$ can be sintered and compacted to form pellets, particularly ceramic pellets, to be used in fuel rods, for instance.

Depending on rate of reducing gas supplied and the incident microwave or radio-frequency power, the method of the invention can also yield $UO_2$ in which the O:U ratio is greater than or equal to 2.04. For some purposes $UO_2$ with a stoichiometric ratio of O:U that is 2.04:1 or greater is acceptable, and such $UO_2$ can be obtained by using less reducing gas, or by using a lower temperature in the reaction zone, say below 800° C., or both.

The heating is carried out by means of radio-frequency or microwave radiation. It is particularly preferred to use microwave radiation and at many places in the following description there is reference only to microwaves. It should be understood that radiofrequency radiation can be used, and reference to microwave radiation should be understood to extend to radiofrequency radiation unless the context requires otherwise. The electromagnetic energy which is preferred for the implementation of the method described, is in the range from 100 kHz to 10 GHz. Preferable industrial frequencies include 2450 MHz, 915 MHz (U.S.A. and Canada), 860 MHz (UK), and 40.68 MHz.

The container can be constructed of any material that will not adsorb microwaves and can withstand temperatures of the order of 1500° C. or higher. It is particularly preferred to use quartz. Other suitable materials include refractory materials with low dielectric loss, for example alumina, magnesia, zirconia and boron nitride. In a preferred embodiment, the container is enclosed in a microwave applicator, or it can act as a microwave applicator (in this case the container is made of a conducting material such as aluminum, stainless steel, etc.). In the case when the container confines the processed material inside a microwave or radio-frequency applicator, it is preferable to use thermal insulation between the container and the applicator walls to reduce the heat loss, increase the uniformity of the temperature, and to protect the applicator walls from excessive heating.

The relative disposition of the $UO_3$ and the $UO_2$ or other initiator material is not particularly limited, so long as they share an interface or common border region that upon irradiation will become the propagating reaction zone. This common border region can be substantially vertical or substantially horizontal, or at an incline. The $UO_2$ initiator or other initiator material can be in granular form. It is preferred that it have an average particle size in the range from about one micron to about one centimeter. The actual size of the particles does not matter as long as the initiator is in contact with the $UO_3$ feed material and provides a good coupling with the microwave energy. It is preferable that the interface between the initiator and processing $UO_3$ material be approximated by a plane surface (in other words, only a small fraction of the initiator particles project into the feed material. Large projections might cause spontaneous and non-uniform development and propagation of the reaction zone and are therefore to be avoided).

The reducing gas may be, for example, hydrogen, methane or other hydrocarbons, synthetic/natural gas, carbon monoxide, ammonia, or a mixture of any of these gases. The hydrocarbon in the reactor must be in the gaseous phase but, at the elevated temperature of the reaction bed (typically 700° to 1200° C.), higher hydrocarbons are gaseous and any may be used. Preferred hydrocarbons may be $C_{2-12}$ or higher. The aforementioned gases may also be in admixture with an inert carrier gas, for example nitrogen or argon. It is possible to preheat the reducing gas but this is not normally necessary. Even with a liquid hydrocarbon, sufficient hydrocarbon vapour can be picked up by passage of carrier gas through the liquid at room temperature. Normally cool reducing gas encounters hot $UO_2$ and is heated thereby, also cooling the $UO_2$, so that the process proceeds in an energy-efficient manner. It is particularly preferred to use hydrogen, either alone or in combination with an inert gas, for example nitrogen or argon. The gas may be at ambient pressure, or at elevated pressure. A preferred pressure range is from ambient up to about 50 psig.

A reactor according to the invention may be equipped with means for transporting the $UO_3$ feed-material to the reactor, and means for transporting the uranium dioxide product from the reactor, permitting the reactor to be used in a moving bed continuous or semi-continuous process. Examples of means for transporting the $UO_3$ feed-material and the uranium dioxide product are a powder feeder, a conveyor, a pneumatic transport system, and a gravity transport system.

Alternatively, the reactor may be used in a batch process.

The $UO_3$ feed-material can be in granular form. Suitable $UO_3$ is usually obtained by thermal decomposition of uranium salts such as uranyl nitrate, ammonium diuranate, etc. There is no preference with respect to the crystal modification of $UO_3$; it may be used in any of its crystal forms or in amorphous form. The preferred range for the average particle size is from about 30 µm to about 1 cm, more preferably about 50 to about 300 µm. However larger or smaller particles may also be used, since the reaction zone will propagate regardless of the particle size provided that a sufficient amount of a reducing gas is supplied. Smaller particles may be processed, but a bed consisting of fine particles would have a high aerodynamic resistance with respect to the flow of reducing gas and is therefore less preferable.

Although it is preferred to have a dry $UO_3$ as a feed material, it may contain some moisture, for instance due to its hygroscopicity, without significantly influencing the performance of the microwave reduction process. Positive results have been obtained with $UO_3$ having a water content of 5% corresponding to the $UO_3 \cdot 0.8H_2O$ crystal hydrate. Water present in the $UO_3$ may influence transport properties of the $UO_3$, causing bridging and sticking to reactor walls and therefore may reduce overall performance. Steam is one of the products of the $UO_3$ reduction. It passes through the $UO_3$ bed with the flow of carrier gas and may be partly absorbed by $UO_3$. Typical $UO_3$ source powder contains less than one percent of nitrate. The nitrate is decomposed in the reaction zone giving rise to $UO_3$ and a mixture of gases (nitrogen dioxide and molecular oxygen). The $UO_3$ is reduced to $UO_2$ and the gases leave the reactor with or without being reduced by hydrogen or methane or other reducing gas. The requirements for the concentration levels of other impurities are determined by the required quality of the $UO_2$ product. In available $UO_3$, typical concentration levels of chlorine and sulfur are no more than about 100 ppm and typical concentrations of phosphorus and calcium are less than about 50 ppm and these concentration levels are acceptable and do not interfere significantly with the desired reaction.

As stated above, pure dry $UO_3$ can not be heated by microwave radiation, owing to its low dielectric loss. It is therefore necessary that reaction shall be initiated in some way. A preferred way is to use an amount of $UO_2$ which is heated by the microwave radiation. Heat from the microwaved $UO_2$ is conveyed to the $UO_3$ at the border between the $UO_3$ and $UO_2$ by conduction from the microwave-heated $UO_2$ and also by convection as the reducing gas passes through the heated $UO_2$ and into the $UO_3$. The $UO_3$ decomposes under the influence of heat and the reducing gas, and there is formed $UO_2$. The radiation is absorbed within the reaction zone, so the process is very energy efficient. As intermediate products of the decomposition of $UO_3$, which undergo further decomposition, there may be formed oxides of uranium intermediate between $UO_3$ and $U_{O2}$, for instance $U_3O_8$ and $U_4O_9$. These oxides will absorb microwave radiation and can therefore be used in place of $UO_2$ to generate the heat needed to initiate decomposition of the $UO_3$. As the reaction proceeds $UO_2$ is formed so that once a steady state is reached the interface is largely or entirely between $UO_3$ and $UO_2$.

As $UO_3$ is decomposed, the amount of $UO_3$ in the reactor is decreased and, correspondingly, the amount of $UO_2$ is increased. Thus, there is a tendency for the interface, or border region between $UO_3$ and $UO_2$ to move, progressing from the $UO_2$ into the $UO_3$, so that there is created the propagating reaction zone. If the microwave radiation is to be directed through the $UO_3$ towards the interface it is desirable that the $UO_3$ shall be substantially dry and substantially free from other material, for example impurities, that will absorb the radiation. The source $UO_3$ material is hygroscopic and may contain absorbed water and some impurities which may absorb the microwave energy, e.g. $U_3O_8$ or $UO_2$. It is desirable that the thickness of the layer of the $UO_3$ feed material above the interface, in the case when the feed contains microwave-absorbing impurities, be smaller than the penetration depth of microwave radiation in the feed material, so that the microwave radiation reaches the interface and produces heat within the reaction zone. The penetration depth in the $UO_3$ feed material is a function of composition of the feed material and decreases with increasing concentration in the $UO_3$ of impurities with high dielectric loss factor such as $UO_2$, $U_3O_8$ and other non-stoichiometric uranium oxides. As a result, no definite number can be provided for the thickness of the feed material. A typical range for the thickness of the $UO_3$ layer is from about 10 mm to about 0.5 m. Desirably the $UO_3$ material should not contain microwave-absorbing impurities at an amount greater than about 5%. This does depend upon the nature of the particular impurity, however. Applicant's experience shows that $UO_3$ containing more than 30 wt % of $UO_2$, or more than 60 wt % of $U_3O_8$ can be reduced to $UO_2$ by the process of the invention.

In general, $UO_3$ may be contaminated with other uranium oxides. The presence of such contaminants will reduce the depth of penetration of microwave energy in such materials as compared with pure $UO_3$. When using such contaminated $UO_3$, if the microwave energy is being passed through the contaminated $UO_3$ it is necessary to reduce the length of the path of the microwave energy in the contaminated $UO_3$, so that microwave energy is delivered to the interface between the $UO_3$ and $UO_2$.

Instead of or in addition to $UO_3$, other source materials may be used in the suggested process to produce $UO_2$. Such materials include uranium compounds that are not good microwave absorbers but may thermally decompose giving rise to $UO_3$ or $U_3O_8$. Examples of such materials include uranyl nitrate, $UO_2(NO_3)_2$, or uranyl nitrate hydrates, ammonium diuranate, $(NH_4)_2U_2O_7$, tetraammonium tricarbonatouranylate, $(NH_4)_4UO_2(CO_3)_3$, "yellow cake", etc. Hence these materials can be used as precursors for in situ preparation of $UO_3$, which then undergoes further reaction. When these materials or their mixture used as a starting material, in addition to or instead of $UO_3$, are in close contact with the hot reaction zone, they are heated by thermal conductivity or by the hot reducing gas passing through the reaction zone and thermally decompose, presumably to $UO_3$. For example, uranyl nitrate decomposes to $UO_3$ at about 300° C. The $UO_3$ formed is reduced, preferably to $UO_2$, by the reaction mechanism described above. In the presence of a reducing gas, the uranium compounds may also be decomposed to the oxides other than $UO_3$ and further reduced to $UO_2$. The gas produced in the decomposition may contain ammonia, carbon dioxide and water, depending on the material used. The gas is removed through the $UO_3$ bed (or the bed of some of the above mentioned materials or their mixture) with the flow of reducing gas.

One embodiment of the invention is described in more detail. The components of the reaction system are placed inside a microwave/radiofrequency reactor in such a way that the $UO_3$ feed material and the $UO_2$ initiator and product form two contiguous layers and the microwave/radiofrequency energy is supplied from the side of the $UO_3$ layer (feed material input), and a reducing gas (typically, a hydrogen/nitrogen or hydrogen/methane mixture) is supplied from the side of the $UO_2$ product output. The incident electromagnetic radiation penetrates through the $UO_3$ layer with negligible attenuation and is absorbed initially by the $UO_2$ and subsequently also by the reduced oxides at the border between the $UO_3$ and $UO_2$ layers, releasing heat. The heat is transported to the adjacent $UO_3$ layer, by thermal conductivity and gas phase forced convection, and increases the temperature of the $UO_3$. It has been found that the temperature may rise to above 700° C. within a few millimeters of the interface between the layer of $UO_2$ and the layer of $UO_3$. As a result, this thin layer begins to absorb the microwave/radiofrequency radiation, its temperature increases further, and thermal decomposition of $UO_3$ takes place. The decomposition may take place in accordance with equation (2).

$$UO_3 \rightarrow \tfrac{1}{3} U_3O_8 + \tfrac{1}{6} O_2. \quad (2)$$

In the flow of reducing gas the intermediate $U_3O_8$ is quickly reduced to $UO_2$ with an O/U ratio of less than 2.04, preferably 2.00 to 2.01. When hydrogen is used as reducing gas the reduction can be represented by equation (3).

$$\tfrac{1}{3} U_3O_8 + \tfrac{2}{3} H_2 \rightarrow UO_2 + \tfrac{2}{3} H_2O. \quad (3)$$

As demonstrated in the examples below, it is found that the amount of consumed hydrogen is less than the stoichiometric amount for the reduction of $UO_3$ to $UO_2$ by equation (1). It is assumed that this is a consequence of reaction in accordance with equation (3), and in some instances a 33% saving in hydrogen, has been achieved. In some cases, the savings are even greater, since the intermediate oxide has a stoichiometry of less than $UO_{2.67}$ because of decomposition to $U_4O_9$ at a higher temperature. When the temperature of the reaction zone is sufficiently high (in a range of 700 to 1400° C.), the hydrogen may be completely consumed by the $U_3O_8$ (and/or $U_4O_9$). In the presence of methane or other reducing species in the gas phase, additional savings in hydrogen are obtained due to participation of these molecules in the reduction process. The high reduction rate of $UO_3$ by methane or other reducing gas that may act as hydrogen substitute is achieved due to the high temperature in the localized reaction zone under microwave/radiofrequency irradiation.

DESCRIPTION OF THE DRAWING

The invention is further illustrated in the accompanying FIG. 1 showing, by way of example and in schematic form, one embodiment of the invention.

In a vessel 1 there is contained a layer 2 of $UO_3$, directly above a layer 4 of $UO_2$. Incident microwave radiation 6 travels through the layer 2 of $UO_3$ and enters an interfacial reaction zone 3 where it encounters the $UO_2$ and possibly other reduced oxides of uranium in layer 4. Hydrogen reducing gas 7 is passed through the layer of $UO_2$ and the layer of $UO_3$, countercurrent to the radiation. Fresh $UO_3$ is supplied as indicated at 5, and $UO_2$ is removed as indicated at 8. As reaction proceeds the reaction zone 3 propagates in an upward direction into the layer 2 of $UO_3$.

Figure 1:
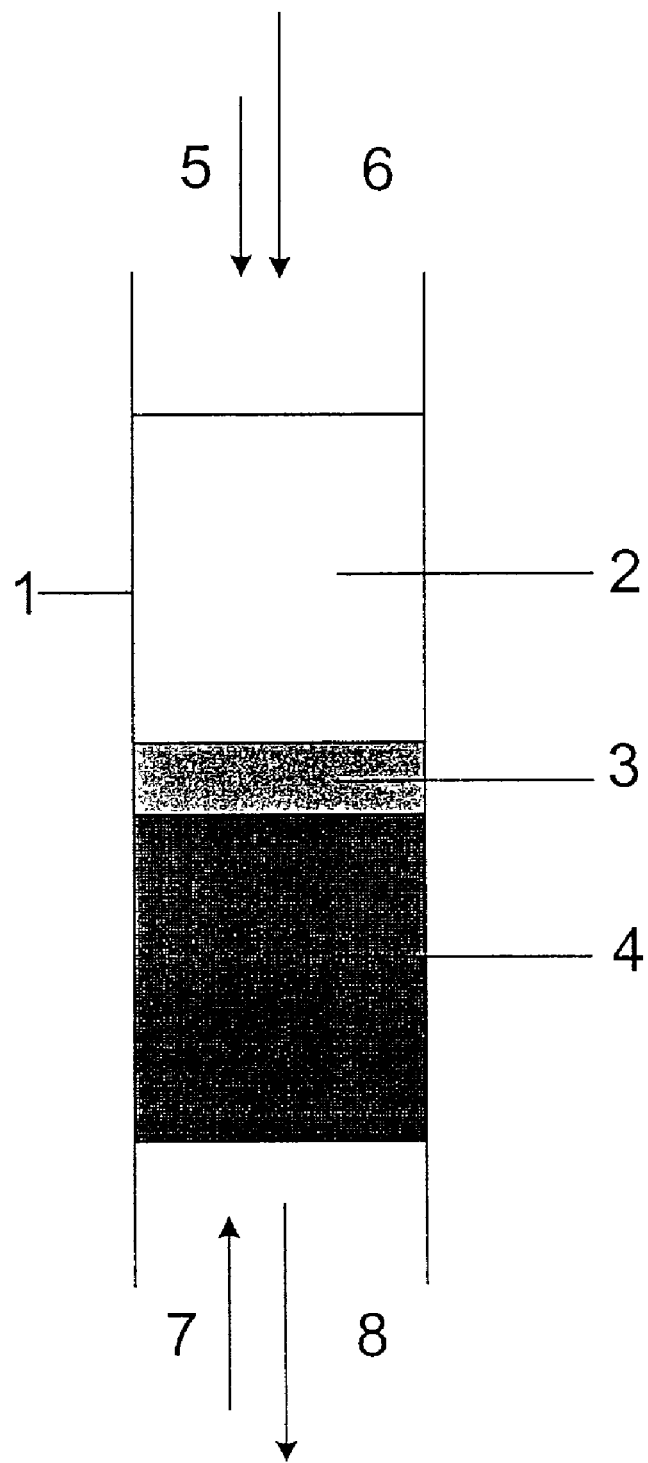

The invention is further illustrated in the following examples. It is to be understood that the examples in no way limit the scope of the invention.

EXAMPLES

Example 1

A 300 g load of non-pulverized $UO_3$ powder having a moisture content of about 0.1% was placed in a quartz tube of 1" diameter on the top of a layer of 25 g $UO_2$ supported on a porous alumina disk. The quartz tube was placed inside a vertical microwave cavity connected to a microwave generator capable of operating at a frequency of 2450 MHz, in such a way that in operation the microwave energy passed first through the $UO_3$ layer, before encountering the $UO_3$/$UO_2$ interface. A mixture of hydrogen and nitrogen gas was supplied to the bottom of the quartz tube and passed upwards through the tube. When the microwave generator was switched on at a 0.5 to 1 kW power level, the $UO_2$ heated up to a temperature of 900 to 1100° C. The gas coming out of the top end of the quartz tube contained water vapor as a product of the uranium oxide reduction. When the reaction was completed, all the $UO_3$ layer was converted to $UO_2$ with an O/U ratio in a range of 2.00 to 2.01. The $UO_2$ product had a uniform particle size distribution in the range from 0.1 to 0.3 mm, with high sphericity and high flowability that significantly exceeded the flowability of the $UO_3$ starting material. The flowability was measured using a Hall Flowmeter and the Standard Test Method for Flow Rate of Metal Powders, ASTM B 213-90, with a 50 g load of $UO_2$ and a calibrated orifice of 2.54 mm in diameter. The flow time for the microwave-reduced $UO_2$ was found to be 21 s, whereas for the starting $UO_3$, it was found to be 46 s. The sphericity was measured as an average ratio of the minimum to maximum particle diameters on magnified photo images of the $UO_2$ product powder. Most particles had a sphericity from 0.8 to 1.0 which explains the high flowability of the product. The O:U ratio was determined by a standard gravimetric technique (by determining the weight change in the sample under conditions when it is converted completely to $U_3O_8$). The $UO_2$ structure and O/U ratio were confirmed by X-ray diffraction (XRD) analysis.

The hydrogen consumption was measured with a calibrated mass flow controller and was found to be 62% of the stoichiometric amount necessary to reduce $UO_3$ by Equation (1). It is believed that the decrease in hydrogen consumption was due to thermal decomposition of $UO_3$ in accordance with equation (2) above.

Example 2

Two powder feeders were connected, one to the top end and one to the bottom end of the quartz reactor described in Example 1. The bottom part of the reactor was filled with $UO_2$. The top powder feeder supplied $UO_3$ powder (540 g total) into the reactor above the $UO_2$ material. The bottom feeder operated synchronously with the top feeder to remove $UO_2$ product from the reactor. The product coming out of the bottom feeder was collected in a container under inert (nitrogen) atmosphere, to avoid oxidation during cool down. The reducing hydrogen/nitrogen mixture was supplied from the bottom end, and the exhaust gas containing water vapors came out at the top end.

$UO_3$ reduction with hydrogen was initiated at a microwave power of 1 kW. The material collected in the container at the bottom of the reactor had a composition of $UO_2$ with an O/U ratio of 2.00 to 2.01, determined as described in Example 1. The amount of hydrogen consumed in the reduction was 67% of the stoichiometric value, again determined as described in Example 1.

Example 3

A 450 g load of non-pulverized $UO_3$ powder was placed in the reactor as described in Example 1. The bottom part of the reactor was filled with $UO_2$. A gas mixture of hydrogen and methane was supplied from the bottom of the quartz tube. The reduction was initiated at 0.5 to 1 kW microwave power level. The gas coming out of the top end contained water vapor and carbon oxides. When the reaction was completed, all the $UO_3$ layer was converted to $UO_2$ with an O/U ratio of 2.00 to 2.01. The hydrogen consumption was found to be 40% of the stoichiometric amount necessary to reduce $UO_3$ by Equation (1).

It is believed that the hydrogen consumption was lower than that required by Equation (1) because a fraction of the $UO_3$ was reduced by methane, and also because of decomposition of $UO_3$ according to Equation (2).

Example 4

The reactor set-up was as described in Example 2. The top container was filled with coarse non-pulverized $UO_3$ powder (0.3 mm average diameter) containing some pieces of the size of a few mm. The bottom part of the reactor was filled with $UO_2$. A gas mixture of hydrogen and natural gas was supplied from the bottom of the quartz tube. The reduction was initiated at 0.5 to 1 kW microwave power level. The gas coming out of the top end contained water vapor and carbon oxides. During the reduction, all the feed $UO_3$ material (540 g total) was converted to $UO_2$ with an O/U ratio of 2.00 to 2.01 and collected, under an inert atmosphere, in the bottom container. The hydrogen consumption was found to be 43% of the stoichiometric amount necessary to reduce $UO_3$ by Equation (1).

Example 5

The reactor set-up was as described in Example 4. The top container was filled with sieved $UO_3$ powder (0.1 mm average diameter). The bottom part of the reactor was filled with $UO_2$. A gas mixture of hydrogen and natural gas was supplied from the bottom of the quartz tube. The reduction was initiated at 0.5 to 1 kW microwave power level. The gas coming out of the top end contained water vapor and carbon oxides. During the reduction, all the feed $UO_3$ material (537 g total) was converted to $UO_2$ with an O/U ratio of 2.00 to 2.01 and collected in the bottom container. The hydrogen consumption was found to be 40% of the stoichiometric amount necessary to reduce $UO_3$ by Equation (1).

The invention claimed is:

1. Apparatus for use in reducing $UO_3$ by means of microwave or radiofrequency radiation, wherein the apparatus comprises (i) a container for containing $UO_3$ and another oxide of uranium and (ii) a source of microwave or radiofrequency radiation that, in operation of the apparatus, directs the radiation towards the interface between the $UO_3$ and the other oxide of uranium in such a manner that the radiation only encounters the interface without having passed through the other oxide of uranium.

2. An apparatus according to claim 1, further comprising means for passage of reducing gas through the container for containing $UO_3$.

3. An apparatus according to claim 1, wherein the apparatus is adapted for operation in a continuous or semi-continuous mode.

4. An apparatus according to claim 1, wherein the apparatus is adapted for operation in a batch mode.

5. An apparatus according to claim 1, wherein the apparatus reduces $UO_3$ to $UO_2$.

6. An apparatus for use in reducing $UO_3$ by either microwave or radiofrequency radiation, wherein the apparatus comprises (i) a container for containing $UO_3$ and another oxide of uranium and (ii) a source of microwave or radiofrequency radiation that, in operation of the apparatus, directs the radiation towards the interface between the $UO_3$ and the other oxide of uranium in such a manner that the radiation only encounters the interface without having passed through the other oxide of uranium.

7. An apparatus according to claim 6, further comprising means for passage of reducing gas through the container for containing $UO_3$.

8. An apparatus according to claim 6, wherein the apparatus is adapted for operation in a continuous or semi-continuous mode.

9. An apparatus according to claim 6, wherein the apparatus is adapted for operation in a batch mode.

10. An apparatus according to claim 6, wherein the apparatus reduces $UO_3$ to $UO_2$.

* * * * *